United States Patent [19]

Bucknam

[11] 4,342,920
[45] Aug. 3, 1982

[54] POWER PLANT AND PROCESS UTILIZING GRAVITATIONAL FORCE

[76] Inventor: Donald C. Bucknam, 2124 S. 110th St., Omaha, Nebr. 68144

[21] Appl. No.: 197,314

[22] Filed: Oct. 15, 1980

[51] Int. Cl.³ .................... F02B 71/04; F02D 39/10; F03G 7/02
[52] U.S. Cl. .................................. 290/1 R; 60/641.8; 123/46E
[58] Field of Search .................. 290/1, 42, 53, 1 R; 60/495–497, 501–503, 507, 641.8, 641.13; 123/46 R, 46 E, DIG. 12, 1 A; 310/12

[56] References Cited

U.S. PATENT DOCUMENTS

| | | | |
|---|---|---|---|
| 975,136 | 11/1910 | Kiely | 123/46 R |
| 2,086,228 | 7/1937 | Janicke | 123/46 R |
| 2,362,151 | 11/1944 | Ostenberg | 290/1 R |
| 3,024,591 | 3/1962 | Ehrat et al. | 123/46 R |
| 3,092,958 | 6/1963 | Duncan | 123/46 |
| 3,362,336 | 1/1968 | Kafka | 290/42 |
| 3,496,871 | 2/1970 | Stengel | 310/12 |
| 3,608,660 | 9/1971 | Smith . | |
| 3,696,795 | 10/1972 | Smith et al. . | |
| 3,927,329 | 12/1975 | Fawcett et al. | 290/1 R |
| 3,988,592 | 10/1976 | Porter | 290/53 |
| 4,173,123 | 11/1979 | Gurtler . | |
| 4,231,720 | 11/1980 | Konig . | |
| 4,242,591 | 12/1980 | Harville | 60/641.8 |
| 4,246,080 | 1/1980 | Shinn . | |

FOREIGN PATENT DOCUMENTS 2624767 12/1976 Fed. Rep. of Germany .
237253 7/1925 United Kingdom ............... 290/1 R Primary Examiner—J. V. Truhe
Assistant Examiner—Shelley Wade
Attorney, Agent, or Firm—Henderson & Sturm

[57] ABSTRACT

A power plant and process for converting gas expanding and contracting energy sources into useful forms of energy and utilizing gravitational force, wherein a piston containing a magnet and able to free fall within an enclosed cylinder, having a non-magnetically-responsive center portion surrounded by an induction coil is repeatedly impelled upwards thereby inducing an alternating electric current in the coil. In the preferred embodiment, a mixture of fuel and air is ignited beneath the piston and compressed air is pumped into a reservoir in response to the piston's upwards motion. The reservoir of compressed air is then used to assist in expelling contaminated gases to increase the pressure of the air and gas mixture, and to serve as an additional source of stored energy. Four alternate embodiments are disclosed: the first injects and ignites fuel at both ends of the cylinder and has no compressed air reservoir, the second directs the heat of concentrated solar energy onto a liquid in the bottom of the cylinder to provide an expanding gas beneath the piston, the third burns hydrogen to create heat which vaporizes water to provide pressure for lifting the piston, after which the water vapor condenses, thus tending to leave a vacuum for assisting the piston downwards, and the fourth burns hydrogen at both ends of the cylinder.

21 Claims, 8 Drawing Figures

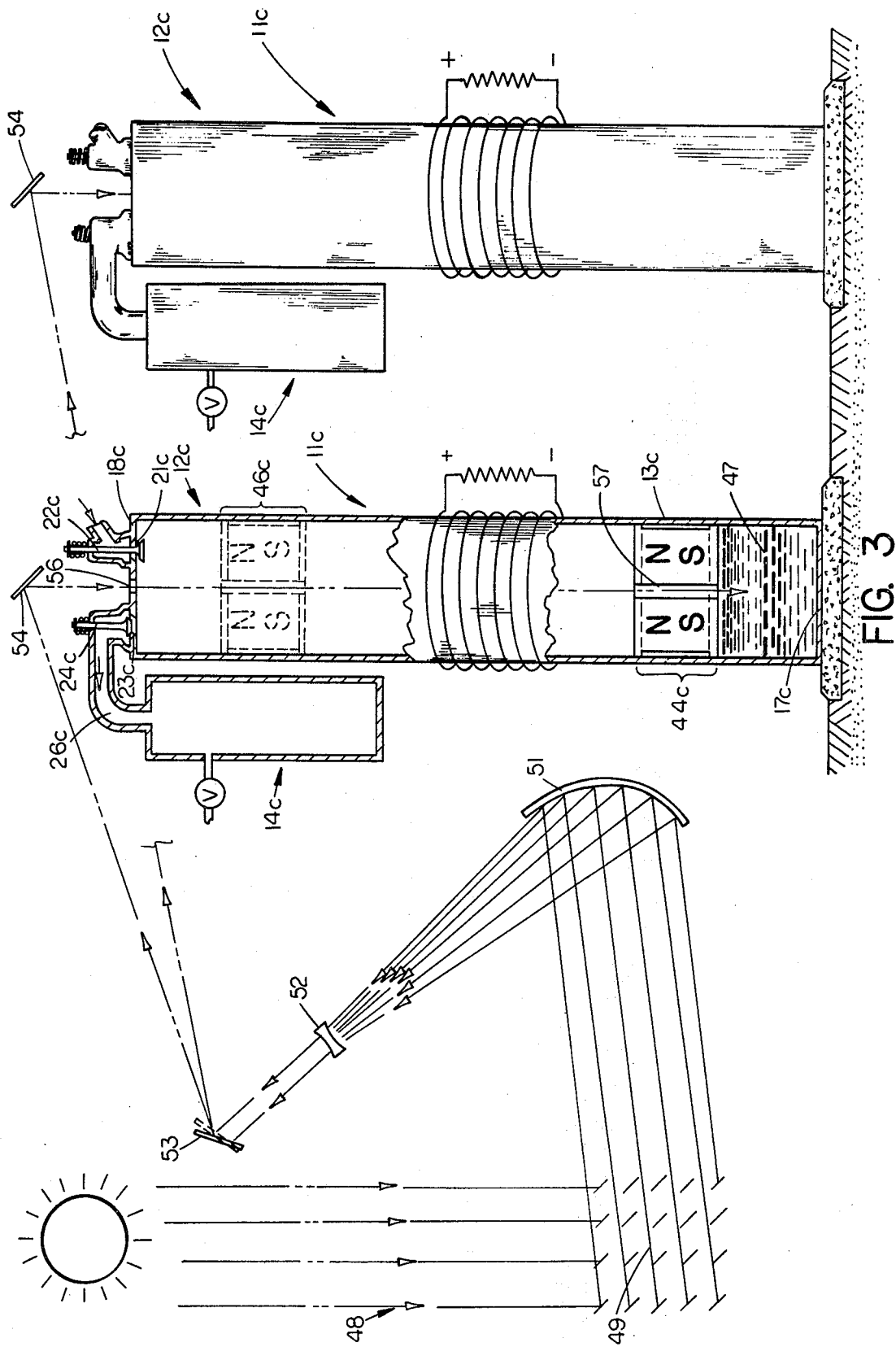

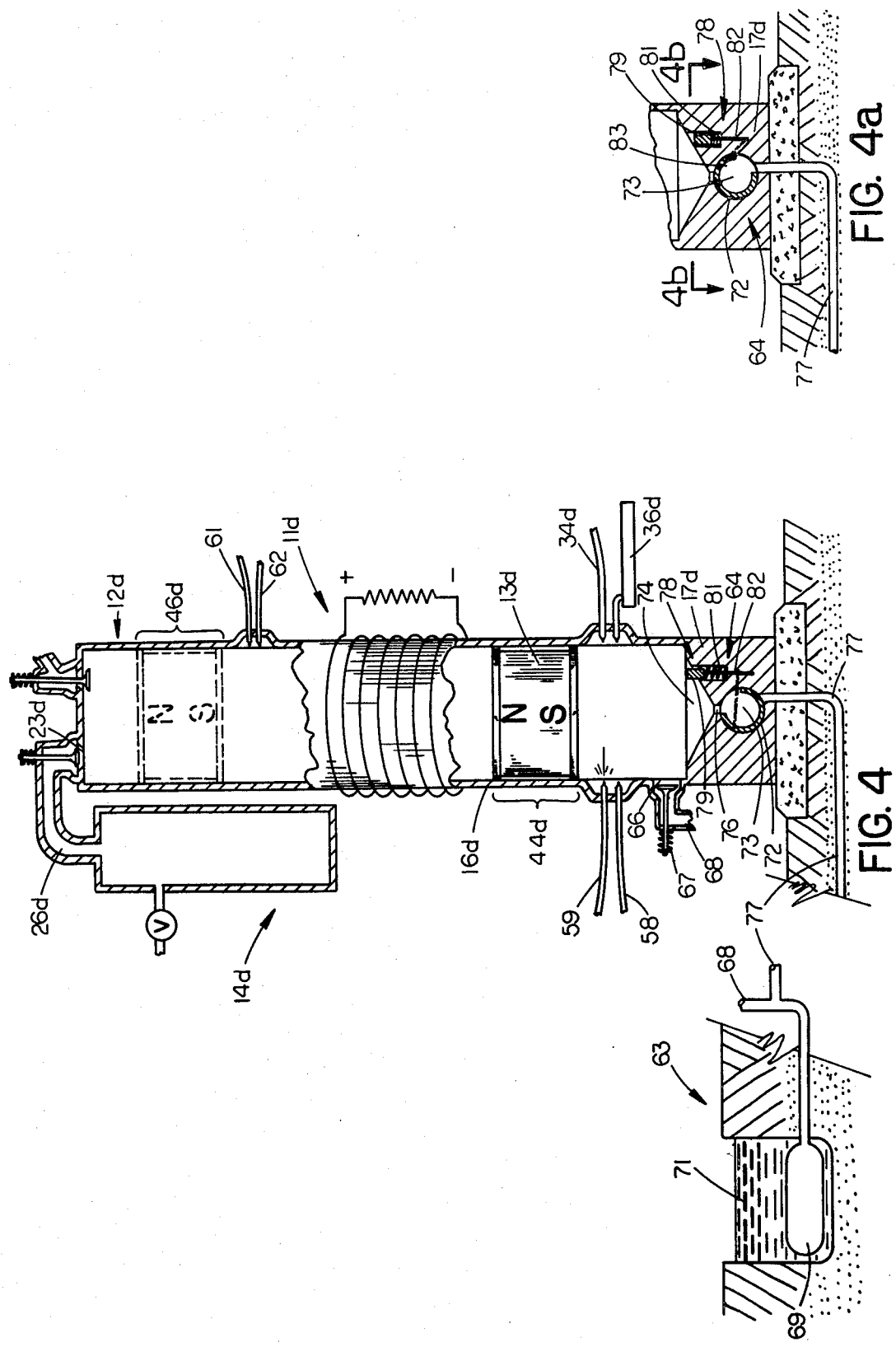

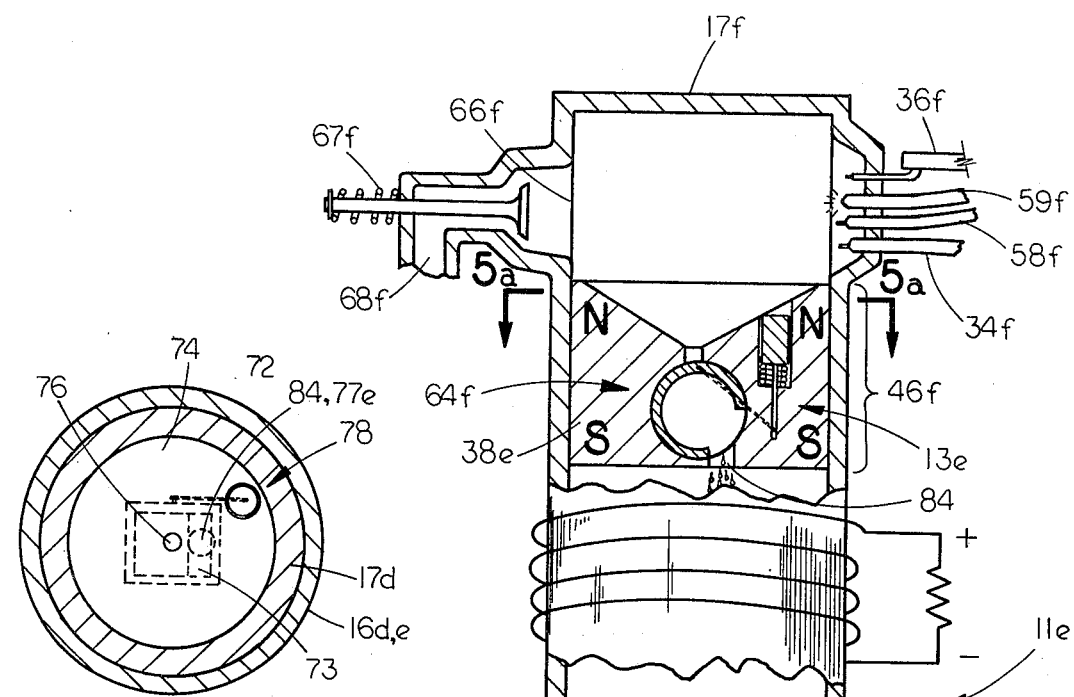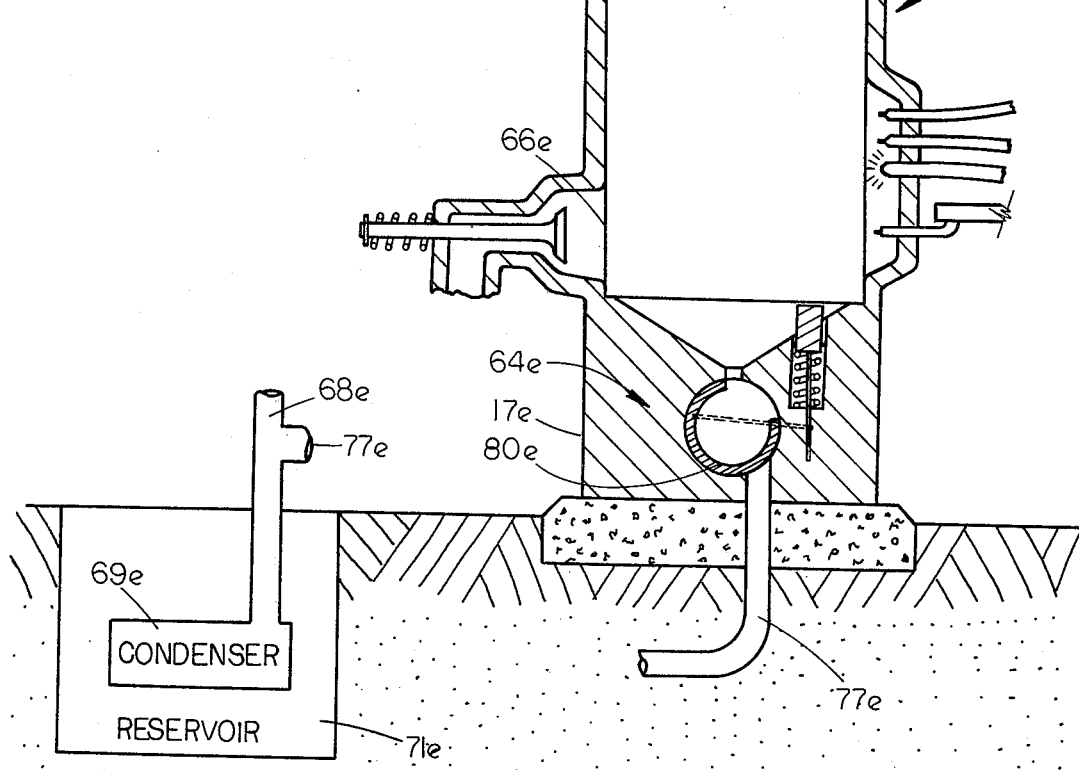
FIG. 4b, 5a
FIG. 5

POWER PLANT AND PROCESS UTILIZING GRAVITATIONAL FORCE

BACKGROUND OF THE INVENTION

1. Field of the Invention

This invention relates generally to power plants and processes for converting energy from fuel or other sources for expanding or contracting gases into useful forms of energy which incorporate enclosed expansion chambers, wherein gases expand or contract anterior to a piston slidably operable within a cylinder and more particularly to such processes and devices which do not require mechanical means of transferring the energy from the piston or a structure such as a flywheel to serve as a reservoir of potential and kinetic energy.

2. Description of the Prior Art

Conventional internal (gas) or external (steam) combustion engines have long been employed to convert fuel energy into various forms of stored energy or to operate moving apparatus. Such devices have traditionally employed mechanical means of transferring the energy such as connecting rods, cranks, and crankshafts. Also, they generally require a flywheel of greater or lesser affect depending upon various factors, such as the number of pistons, the massiveness of engine parts, and the requirements for smooth and constant flow of energy. In addition, other conventional parts are required, such as piston pin bearings, crosshead bearings, crank pin bearings, and journal end bearings, all needing lubricating means. The momentum acquired by the piston must be cancelled by the crank at the end of every stroke.

If the device employs internal combustion, either a crankcase or turbine is required. If it uses external combustion, a burner, boiler, turbine and smokestacks are needed. (All of the latter are dispensed with in the present invention.)

To meet demands for strength and stress, such auxiliary parts require additional materials, all of which reduce the ratio of energy available to perform work to the fuel consumed. Correspondingly, downtime for maintenance and repairs is reduced. Furthermore, applications such as power plants, which are designed to produce great quantities of energy, have size limitations governed by the strength and stress-withstanding properties of available materials.

SUMMARY OF THE INVENTION

A piston containing a magnet is repeatedly impelled upwards within an enclosed cylinder having a load-connected electrical conductor coil surrounding its center portion. Alternating electrical current is induced in the conductor coil in response to the upwards and downwards movements of the magnet. The preferred embodiment provides for the injection and ignition of fuel near the lower end of the cylinder and the storage of compressed air produced by the upward motion of the piston in a reservoir to be then used to assist in exhausting contaminated gases, to provide more complete combustion, and to provide an additional source of energy in the form of compressed air.

An alternate embodiment does not include a compressed air reservoir, but provides for the injection and ignition of fuel alternately at both ends of the cylinder.

Another alternate embodiment includes a compressed air reservoir to provide an additional source of energy and utilizes concentrated solar energy as a source of heat energy by directing it through a transparent structure in the upper end of the cylinder and a transparent core in the piston onto a black colored liquid in its lower end so that the liquid will vaporize.

Yet other embodiments employ burning hydrogen to form water, first creating heat and pressure and then a vacuum beneath and then above the piston.

Thus, in addition to gravity acting alone and a second combustion chamber at the upper end, the other means for returning the piston to its starting position are air compressed above the piston and the condensation of vapor when concentrated solar energy is used to expand a liquid beneath the piston or hydrogen is burned in the presence of atomized water.

An object of the present invention is to provide a process for converting energy into useful forms without employing expensive, heavy and dangerous moving parts, such as connecting rods, cranks, crankshafts, and flywheels.

Another object of the invention is the economic conversion of fuel or solar energy into electrical energy regardless of the size of the device.

Still another object of the invention is to circumvent the limits imposed by mass, intertia, momentum, wear maintenance, and manufacturability of the parts.

A further object of the invention is to convert fuel or solar energy into compressed air for use as a supplemental source of stored energy.

Still further objects are to eliminate costly and massive parts, reduce the consumption of fuel, and reduce pollution.

Yet another object is to provide a simpler device, less expensive to build and thus requiring less fuel than would be otherwise required.

Yet a further object of the invention is to utilize space occupid by the secondary parts of a conventional engine for the principle parts of the electrical energy generating parts of the present invention.

Other objects, advantages and novel features of the present invention will become apparent from the following detailed description of the invention when considered in conjunction with the accompanying drawings.

BRIEF DESCRIPTION OF THE DRAWINGS

FIG. 3 is a diagrammatic fragmented, cross-sectional side view of an alternate embodiment wherein a structure for vaporizing and expanding a liquid by concentrated solar energy is shown;

FIG. 4 is a diagrammatic fragmented, cross-sectional side view of an alternate embodiment wherein structure for burning hydrogen below the piston assembly and a drain release valve for surplus water is shown;

FIG. 4a shows the drain release valve of FIG. 4 in its release attitude;

FIG. 4b is a sectional view of the embodiment of FIG. 4 taken through line 4b—4b of FIG. 4;

FIG. 5 is a diagrammatic fragmented, cross-sectional side view of an alternate embodiment wherein structure for burning hydrogen below and above the piston assembly and two drain release valves are shown; and FIG. 5a is a sectional view of the embodiment of FIG. 5 taken through lines 5a—5a of FIG. 5.

DESCRIPTION OF THE PREFERRED EMBODIMENTS

Preferred Embodiment

Figure 1:
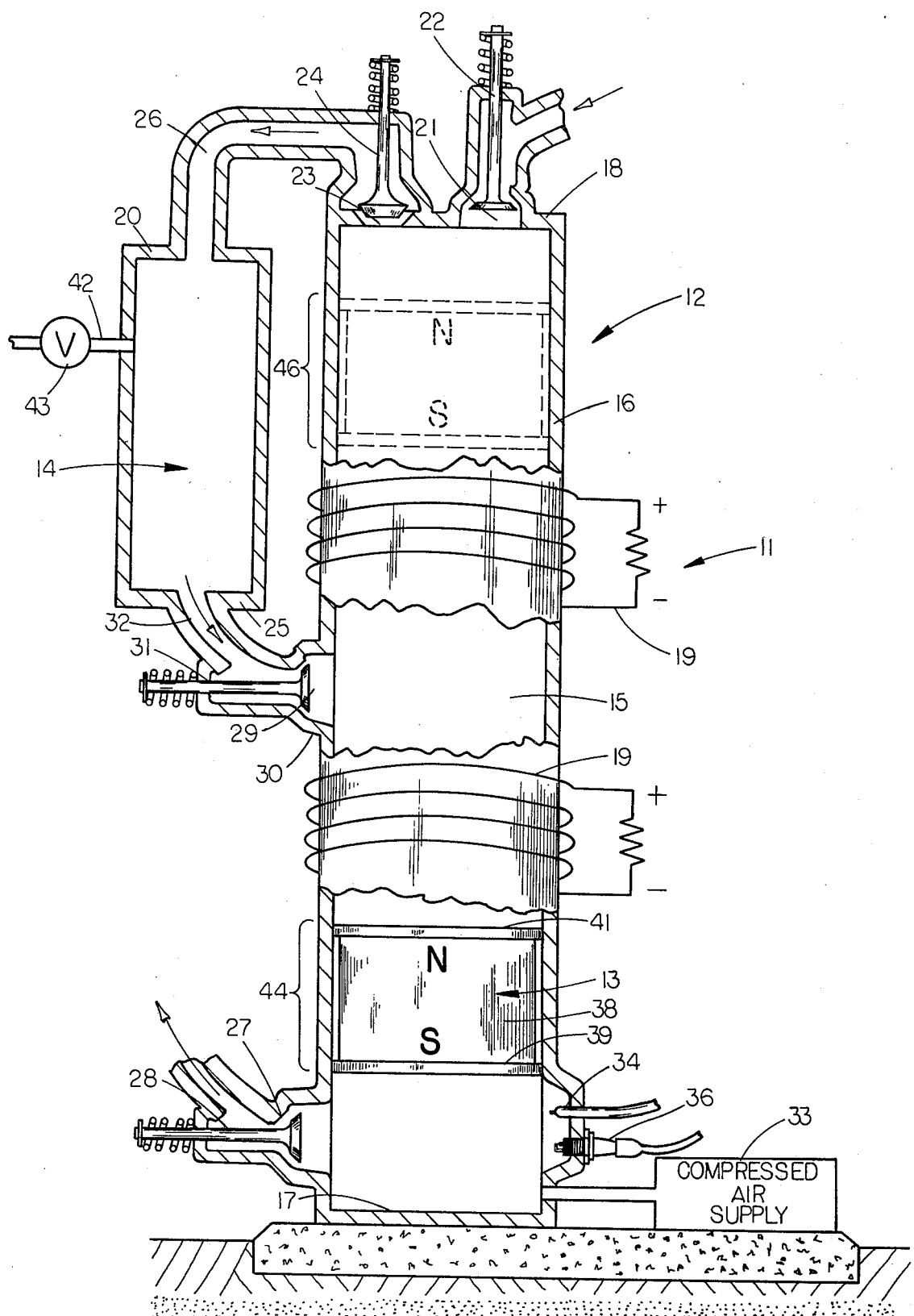
FIG. 1 is a diagrammatic fragmented, cross-sectional side view of the preferred embodiment wherein a drive assembly comprising an air reservoir is shown.

Referring now to the drawings, wherein like reference numerals designate identical or corresponding parts throughout the five embodiments, and more particularly to FIG. 1, the preferred embodiment, the power plant is depicted generally as 11 includes a cylinder assembly 12, a piston assembly 13, and an air reservoir 14. The cylinder assembly 12 is comprised of a cylinder wall 16, a lower end wall 17 attached to the cylinder wall 16 at or near the ground, an upper end wall 18 attached to the upper end of the cylinder wall 16, and a load-connected electrical conductor coil 19 surrounding a center portion 15 of the cylinder. The center portion 15 of the cylinder 16 must be of a non-magnetically-responsive material of either metal or ceramic. By properly supporting the upper half of the cylinder, the walls of the central part of the cylinder 15 between the ends may be relatively thin, thus permitting the coil to be in close proximity to the magnetic piston. As compared to the center portion 15, most other parts of the cylinder assembly 12 especially the end walls, are subject to higher demands for structural strength, heat resistance, and pressure resistance. Materials with appropriate properties are well known and are required for the device to function properly.

The upper end wall 18 of the cylinder assembly 12 has an inlet port 21 with a spring-biased valve 22 mounted therein and an outlet port 23 with a spring-biased valve 24 mounted therein which is connected by a tube 26 to first end 20 of air reservoir 14. Adjacent the lower end wall 17, located in cylinder wall 16 is an exhaust outlet port 27 for exhausting contaminated gases with a mechanically operated spring-biased exhaust valve 28 mounted in it. A second inlet port 29 located in protrusion 30 of cylinder wall 16 intermediate the ends of the cylinder assembly 12, having valve 31 mounted in it, is connected by tube 32 to second end 25 of air reservoir 14.

Completing the cylinder assembly 12, compressed air supply 33 (which could be a compressed air reservoir or a conventional starter air pump), a conventional fuel injector 34, and a conventional fuel ignition structure 36 are connected to cylinder assembly 12 through a protrusion in the cylinder wall 16 adjacent the end wall 17. In addition, electronic timing devices (not shown) and hydraulic or solenoid switches (not shown) are provided for controlling spring-biased valves (22, 24, 28, and 31), fuel injector 34, and ignition structure 36, so as to synchronize their functioning in accordance with the process for converting energy as hereinafter described.

The piston assembly 13 is slidably operable within the cylinder assembly 12 and includes an intermediate bar magnet in the form of a magnetic disc 38 which has a lower ceramic plate 39 and an upper ceramic plate 41 secured to its lower and upper ends, respectively, to serve as piston rings. The polar axis of the bar magnet 38 is oriented so that it coincides with the longitudinal axis of the cylinder assembly 12. The upper and lower plates 39 and 41, may be of other non-magnetically-responsive material such as copper or aluminum.

In the present invention, the momentum needed to achieve the exhaust, intake, and compression cycles in a conventional fashion, resides entirely within the piston and that which was lost to turn a crank is now available to compress the charge. Furthermore, there is practically no limit to the speed of the piston or distance of its travel. Increasing its velocity results in an increased compression ratio, a correspondingly smaller combustion chamber. The invention, having no crank, makes varying the compression ratio an easy matter, which also permits employment of various types of fuels. Also by increasing the fuel delivered to or decreasing the load placed upon the device, the speed of the piston may be increased without limit. It may be slowed down by increasing the pressure and quantity of air it is pumping or the amount of electricity it is producing. With a vertical cylinder and unconnected piston, losses due to friction should be minimal.

Air reservoir 14 has a take-off tube 42 with check valve 43 mounted therein. As will be noted hereinafter, air reservoir 14 may be utilized as a supplementary source of stored energy by tapping compressed air through tube 42. In addition, storing and releasing energy in this manner further provides for fluctuations in load.

The process of converting energy with the power plant 11 includes a starting phase and a repeating cycle phase. Prior to initiating the starting phase, the piston assembly 13 is held at rest at starting position 44 by a small column of compressed air maintained by compressed air supply 33. Compressed air supply 33 then lifts the piston assembly 13 to an apex position 46 near upper end wall 18. During this operation all ports except outlet port 23 are in closed position so as to permit the column of air above piston assembly 13 to pass through tube 26 into air reservoir 14, creating a supply of compressed air therein. When piston assembly 13 reaches apex position 46, compressed air supply 33 is turned off and valve 28 in outlet port 27 is allowed to open so as not to impede the free fall of piston assembly 13. The free falling piston assembly 13 will pull open valve 22, permitting fresh air to enter through inlet port 21 and allow valve 24 to close, sealing off the supply of compressed air now in air reservoir 14. When piston assembly 13 has reached a point where, after exhaust valve 28 is closed the air being compressed beneath it will not stop it from reaching starting position 44, exhaust valve 28 is then closed. The mass of the piston and the time of the closing of valve 28 will determine the compression ratio and therefore the size of the combustion chamber.

Prior to piston assembly 13 returning to starting position 44, fuel is injected by fuel injector 34, and, as piston assembly 13 reaches starting position 44, the fuel is ignited, forcing piston assembly 13 again to apex position 46. During this ascent of piston assembly 13 the spring-biased valves 22 and 24 will direct the column of air above piston assembly 13 to enter through tube 26 into air reservoir 14, further compressing the air therein so long as valve 31 continues to be held in a closed position. However, as piston assembly 13 ascends past inlet port 29, spring-biased valve 31 is allowed to open and admit a charge of compressed air below the piston which assists in pushing the piston upward and expelling the contaminated gases beneath piston assembly 13 downward through exhaust port 27 and supplies a fresh charge of compressed air beneath the piston assembly 13. After a sufficient charge of compressed air is passed through inlet port 29, spring-biased valve 31 is again held closed, causing the column of air remaining above piston assembly 13 to be forced into air reservoir 14 as the momentum of the piston assembly 13 continues to carry it up to the apex position 46. The first cycle of the repeating cycle has now been completed and the second cycle is initiated as was the first by piston assembly 13 beginning its second free fall towards cylinder assembly end wall 17.

The timing of each step of the process is controlled by electronic timing devices through conventional switches operated by solenoids or by hydraulic or mechanical controls where necessary. Electronic timing devices which have provisions for adjustments to allow for variations in fuel, atmospheric pressure, temperature, etc., are well known; and, under a given set of parameters, gravity being constant, once an appropriate timing sequence is determined, the energy converting deivce 11 will continue the repeating cycle. By employing a plurality of valves, directional intake and outlet ports, as well as baffles (not shown); adequate breathing and forcing of contaminated gases downwards without mixing with intake air, may be insured.

Energy will be converted into electrical energy as the magnetic forces of the magnetic disc 38 pass by the electrical conductor coil 19, thereby inducing an electric current. Means for converting the alternating current thus produced into suitable frequencies and voltages for transmission over long distances are well known and not shown herein. Also, stored energy is available in the form of compressed air by opening valve 43 mounted in take-off tube 42.

First Alternate Embodiment

Figure 2:
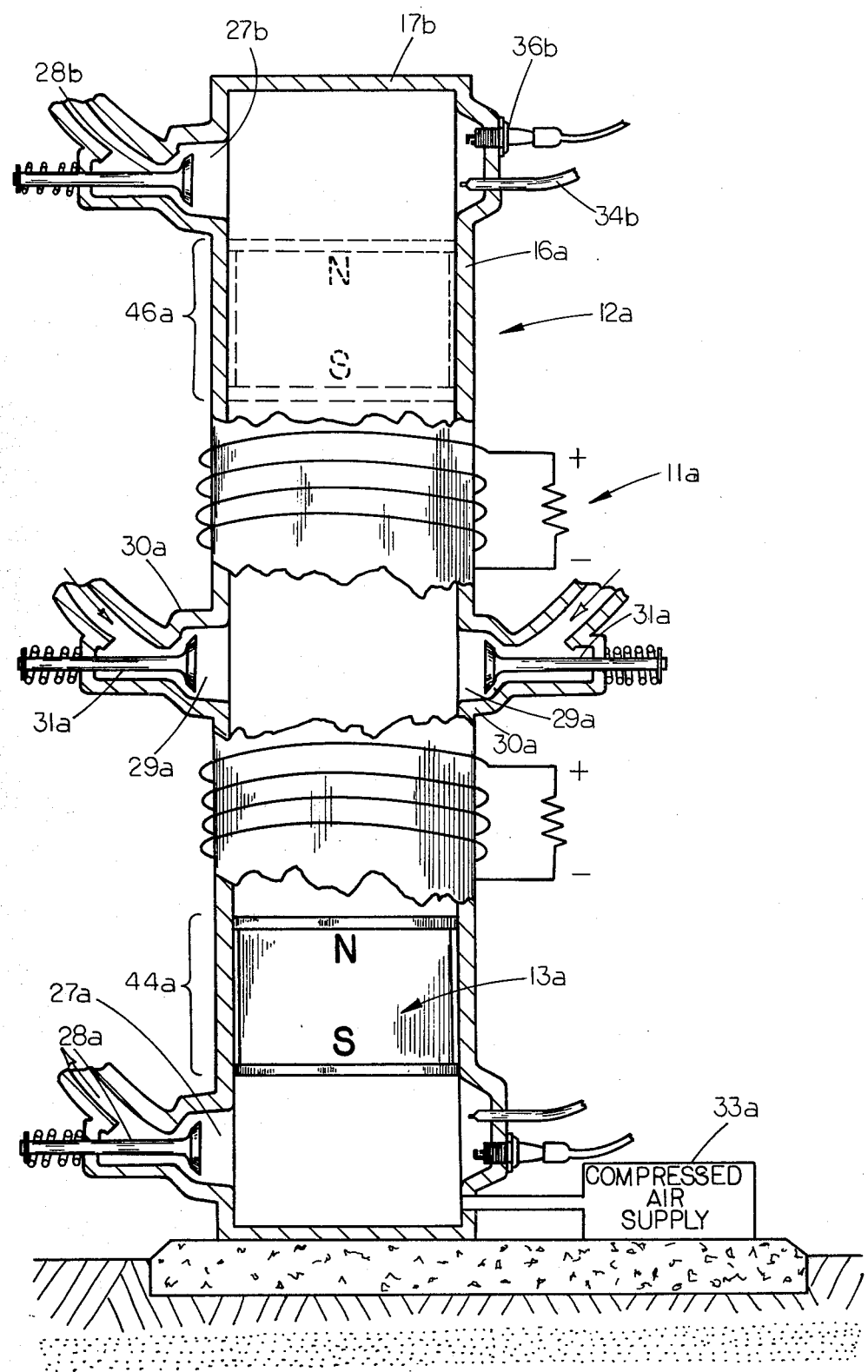
FIG. 2 is a diagrammatic fragmented, cross-sectional side view of an alternate embodiment wherein fuel injecting, igniting and exhaust structures are shown at both ends of the cylinder.

Referring now to FIG. 2, an alternate embodiment of the power plant is depicted generally as 11a and includes a cylinder assembly 12a and a piston assembly 13a. This embodiment differs from the preferred embodiment in that it does not include an air reservoir with its attendant parts nor inlet and outlet ports with valves for pumping fresh air in its upper end wall, but has instead, adjacent its upper end wall 17b, connected to cylinder assembly 12a through cylinder wall 16a, the same elements power plant 11 has adjacent its lower end, with the exception of a compressed air supply structure 33. These elements include exhaust outlet port 27b with spring-biased exhaust valve 28b mounted in it, fuel injector 34b, and fuel ignition structure 36b, all located in cylinder wall 16a adjacent to upper end wall 17b. Intermediate the ends of cylinder assembly 12a are one or more inlet ports 29a located in protrusions 30a in cylinder wall 16a and having valves 31a mounted in them. In all other respects the power plant 11a has parts parallel to those of power plant 11 and said parts are designated by corresponding numerals with the letter "a" appended thereto.

The process of converting energy with the power plant 11a includes a starting phase identical to that of the starting phase of power plant 11, piston assembly 13a being lifted by compressed air from 33a to apex position 46a near upper end wall 17b and exhaust valve 28b being allowed to open so as to permit the column of air above piston assembly 13a to pass through exhaust outlet port 27b. As in the preferred embodiment, after piston assembly 13a reaches apex position 46a, compressed air supply 33a is turned off and exhaust valve 28a is allowed to open and valves 28b and 31a are also held open so as to permit the free fall of piston assembly 13a.

As the piston assembly 13a descends past inlet port 29a, inlet valve 31a is open, and outlet valves 28a and 28b close, causing the descending piston assembly 13a to compress the air remaining beneath it while drawing air in above it through intake port 29a. Then duplicating the process of power plant 11, fuel is injected prior to piston assembly 13a reaching starting position 44a and ignited as it reaches starting position 44a. Valve 31a then closes and exhaust valve 28b opens permitting the exhaust to escape. As piston assembly 13a ascends past inlet port 29a valve 31a opens and valve 28b closes, drawing in clean air beneath the piston assembly 13a and compressing air above it as the momentum of the piston carries it to its apex position.

Prior to piston assembly 13a reaching apex position 46a, fuel is admitted by fuel injector 34b. As piston assembly 13a reaches apex position 46a, the highly compressed air and fuel mixture above it is ignited by ignition structure 36b. Intake valve 31a is then closed and exhaust valve 28a is opened. At this instance the repeating cycle of power plant 11a is initiated and all of the valves, fuel injectors, and ignition structures, being controlled by electronic timing devices (not shown) operate in the same sequence as described above following the first descent of piston assembly 13a from apex position 46a. In the case of energy converting device 11a, the material requirements with respect to cylinder assembly 12a and piston assembly 13a are identical to those of energy converting device 11 and electronic timing devices will maintain sequential control, after necessary adjustments, of the various elements including conventional valve-switching gear. Fuel energy will be converted into electrical current by induction in like manner.

As in conventional internal combustion engines, fresh air is admitted through inlet port 29a whenever atmospheric pressure (plus or minus 14 PSA) exceeds the pressure behind the piston as it moves up or down; however, superchargers may be utilized if desired.

Second Alternate Embodiment

Referring now to FIG. 3, a second alternate embodiment of the power plant is depicted generally as 11c and also includes a cylinder assembly 12c and a piston assembly 13c, as well as an air reservoir 14c. In this embodiment, at least two complexes of cylinder assembly 12c, piston assembly 13c, and air reservoir 14c are synchronized so as to produce a more constant supply of converted energy and to maximize the use of sunlight. Although an air reservoir 14c is shown for each power plant complex, a single air reservoir could serve several such complexes. This embodiment differs from the preferred embodiment in that air reservoir 14c is not connected to an inlet port in cylinder wall 16c intermediate the ends of the cylinder assembly 12c and in that cylinder assembly 12c has (in place of a valved outlet port, a compressed air supply means, a fuel injector, and a fuel ignition structure) a black colored liquid 47 contained beneath starting position 44c and adjacent its lower end wall 17c a volume of inert gas (now shown) above liquid 47, and a concentrated solar energy assembly 48.

Concentrated solar energy assembly 48 for vaporizing the black colored liquid 47 includes conventional heliostat reflectors 49, parabolic concentrator-reflector 51, concave lens 52, movable reflector 53, stationary reflector 54, solid transparent portion 56 of upper end wall 18c, and solid transparent core portion 57 of the piston assembly 13c. In all other respects power plant 11c has parts parallel to those of power plant 11 and said parts are designated by corresponding numerals with the letter "c" appended thereto.

As in the Preferred Embodiment, the process of converting energy with power plant 11c includes a starting phase and a repeating cycle phase. Prior to initiating the starting phase, the piston assembly 13c is held at rest at starting position 44c by resting upon the volume of inert gas above the black colored liquid 47. The inert gas serves to produce the effect of a bounce chamber for piston assembly 13c. In this embodiment, the starting phase is initiated by the vaporization of liquid 47 when concentrated solar energy is directed upon it. The black colored liquid 47 is thereby vaporized forming an expanding gas which lifts the piston assembly 13c to apex position 46c near upper end wall 18c. During this operation, the column of air above piston assembly 13c passes through outlet port 23c and tube 26c into air reservoir 14c creating a supply of compressed air therein. When the vapor expanding beneath piston assembly 13c is sufficient to left it to apex position 46c, movable reflector 53 of solar energy means 48 directs concentrated solar energy to another stationary reflector 54 of another complex, allowing piston assembly 13c to free fall as black colored liquid 47 cools and condenses. The free falling piston assembly 13c will pull open valve 22c permitting fresh air to enter through inlet port 21c and allow valve 24c to close, sealing off the supply of compressed air now in air reservoir 14c. Prior to piston assembly 13c returning to starting position 44c, and as the vaporized black colored liquid 47 has begun to condense and accumulate adjacent to lower end will 17c, concentrated solar energy means 48 is again directed to the original stationary reflector 54 in order that the black colored liquid reaccumulating in the bottom of cylinder assembly 12c is maintained at whatever temperature above its boiling point which is desired with respect to operational requirements.

When piston assembly 13c has reached its starting position 44c, the first repeating phase is initiated by the revaporization of the black colored liquid 47. In this embodiment of the energy converting device the only difference between the starting phase and the repeating phases is that the temperature of the black colored liquid 47 is ambient only in the starting phase and is higher during any repeating phase. Thus, the velocity of the ascending piston may be varied by controlling the operating temperature of the condensed black colored liquid 47. There must be enough inert gas above the water in the cylinder to provide a bounce chamber at the bottom of the cylinder which will deter the falling piston from ever physically striking the liquid. Were the piston to suddenly free fall against the liquid upon the setting of the sun or sudden moving in of cloud cover, the shock would undoubtedly do great damage to the cylinder unless other cushioning steps were taken.

It is believed that the method for producing and directing a beam of concentrated solar energy may not be generally known by those skilled in the pertinent art and, therefore, the following explanation is included herein. Sunlight is reflected by heliostat 49, which is comprised of a large array of steered mirrors. As the sun moves across the sky, the heliostat 49 directs the beams to a parabolic concentrator-reflector 51 which is fixedly mounted and which directs the collection of beams through a concave lens 52. The lens 52 causes the collection of beams to become a concentrated parallel beam and is located so as to direct this beam onto a movable mirror 53. Mirror 53 is controlled by solenoid or hydraulic means to alternately direct the concentrated solar energy to the several stationary mirrors 54 where the beam is alternately reflected through transparent portion 56 of upper end wall 18c and transparent core portion 57 of piston assembly 13c onto the black colored liquid 47 in each cylinder assembly 12c.

As in the case of power plant 11 and 11a, the material requirements with respect to cylinder assembly 12c and piston assembly 13c are identical except for the transparent portion 56 in upper end wall 18c and the transparent core 57 in piston assembly 13c. A suitable agent for coloring the liquid 47 black is graphite containing some oil lubricant. Electronic timing devices will maintain sequential control of the movable mirror 53. After necessary adjustments of the various elements including conventional valve switching gear, concentrated solar energy will be converted into electrical current by induction in like manner. Compressed air stored in air reservoir 14c provides an additional source of converted energy.

The inventor believes that a more efficient way to utilize solar energy is to convert it first to chemical energy so as to dissociate the elements of a liquid into its elements hydrogen and oxygen with the aid of a catalyst, such as a rhodium compound, and later liberate this stored energy by recombining and releasing their heat inside an engine. For an explanation of this method of producing hydrogen and oxygen see *Popular Science*, Science Newsfront, p. 61 (May 1980). The stored chemical energy far exceeds the latent heat required to achieve the phase change which converts water into vapor. There might be enough heat given off in the process of forming water that the pressure of the vapor immediately after its formation may be the same as that of the hydrogen and oxygen gas immediately before its burning.

Third Alternative Embodiment

Referring now to FIGS. 4 and 4a, an additional alternate embodiment of the power plant is depicted generally as 11d and also includes a cylinder assembly 12d and a piston assembly 13d, as well as an air reservoir 14d. This embodiment is similar to the embodiment employing concentrated solar energy in that air reservoir 14d is not connected to an inlet port in cylinder wall 16d, is different than the concentrated solar energy embodiment in that it does not employ concentrated solar energy nor any of the complementary elements and structures, and is similar to the preferred embodiment in that it employs fuel injector 34d and ignition structure 36d for the introduction and ignition of a fuel; in this embodiment that fuel is hydrogen gas.

This hydrogen burning embodiment also includes oxygen injector 58, water injecting atomizer 59, second hydrogen injector 61, second oxygen injector 62, water vapor condensing assembly 63, and automatic drain relief valve assembly 64.

The water vapor condensing assembly 63 includes vapor outlet port 66 with a spring-biased valve 67 mounted therein connecting tube 68 to a separate condensor 69 which contains a near perfect vacuum and is enveloped by chilled water 71.

Drain release valve assembly 64 includes cylinder 72 which revolves within a recess within thickened lower end wall 17d. Said cylinder 72 has a pocket 73 to receive condensed water vapor collected by concave depression 74 of end wall 17d and throat 76 of end wall 17d and eject said condensed water vapor through outlet tube 77. Outlet tube 77 may be connected to separate condensor 69 either directly or through connecting tube 68. Tube 77, being connected to condenser 69 which contains a vacuum, will also contain a vacuum; said vacuum will assist gravity in removing water from pocket 73. Drain release valve assembly 64 also includes pressure control structure 78 which has activating piston 79, compression spring 81, shaft 82, and connecting rod 83. In operation, compression spring 81 holds activating piston 79 in raised position, as best can be seen in FIG. 4, until the pressure within cylinder assembly 12d and beneath piston assembly 13d rises to a pre-set level sufficient to force shaft 82 downwards to the position which can best be seen in FIG. 4a. Connecting rod 83 being pivoted between a fixed position on cylinder 72 and the lower end of shaft 82 will then cause cylinder 72 to rotate from its collecting position as can be seen in FIG. 4, to its dispensing position as can be seen in FIG. 4a.

In all other respects, power plant 11d has parts parallel to those of power plant 11 and said parts are designated by corresponding numerals with the letter "d" appended thereto.

The process of converting energy with power plant 11d is most analogous to that of the concentrated solar energy embodiment herein next above described. Its starting phase is initiated by the injection of two parts hydrogen and one part oxygen beneath the piston assembly to lift it to a starting position 44d. Water is then injected through the atomizer or nozzle structure 59 simultaneously with the ignition of the gases beneath the piston assembly. In this embodiment a laser or other type of igniter must be used because a spark plug will not function in the moist environment. This results in super-heated steam adequate to force piston assembly 13d to apex position 46d forcing the column of air above piston assembly 13d through outlet port 23d and tube 26d into air reservoir 14d. As the steam beneath piston assembly 13d begins to condense, a vacuum is created which assists the return of piston assembly 13d to starting position 44d.

After piston 13d reaches apex position 46d, valve 67 opens port 66 to permit remaining water or water vapor to escape from the bottom of the cylinder to the cooled separate condensor 69, which always contains a near perfect vacuum. Thus, a vacuum beneath the piston is provided for a longer period of time, thereby assisting gravity in returning the piston to starting position 44d. When piston 13d has reached a position about half way down the cylinder, valve 67 is closed and hydrogen and oxygen injectors 34d and 58 in the lower end of the cylinder again admit a fresh charge of two parts hydrogen and one part oxygen, respectively. When the new charge is released from pressurized containers into the partial vacuum, it expands, cools, and further increases the pressure, thus causing any remaining water vapor residing in the cylinder to condense on the cylinder walls. This precipitation provides an even greater vacuum, thereby allowing for the addition of more of the gaseous components of water.

As piston 13d, on its way down, starts to compress the new charge, its velocity is reduced by the increasing gas pressure beneath it. The water droplets continue to fall at the same, or increased, rate of speed and collect in concave depression 74 of endwall 17d, leaving a relatively pure mixture of hydrogen and oxygen gas immediately above the water and below the piston. The downward motion of the piston is eventually stopped by the increasing gas pressure, resulting is a bounce chamber effect at the bottom of the cylinder. When piston 13d reaches starting position 44d, if the hydrogen beneath it does not pre-ignite, ignition structure 36d ignites the mixture, turning the bounce chamber into a combustion chamber and initiating the first repeating phase. The heat of combustion of hydrogen and oxygen then vaporizes the water droplets still falling and collecting on the cylinder walls and in concave depression 74. The resulting tremendous quantity of heat vaporizes additional water to create more steam which again drives the piston to apex position 46d. Water injecting atomizer 59 provides this additional water immediately before combustion occurs. Cooling within the cylinder, between combustions, reduces the need for removing excess heat which can now be tapped at the condenser.

If a long stem cylinder is used, separate condensor assembly 63 may not be required. A fresh, cold, high pressure charge of hydrogen and oxygen could be admitted at various locations below the pistons, as by injectors 61 and 62, when the piston is still at apex position 46d rather than after it has returned downward to a position midway between the upper and lower ends of the cylinder. If the charge were admitted immediately below the piston while the piston is at apex position 46d, the incoming mixture would cool and condense the water vapor residing there and draw the remaining water vapor from below upwards. The resulting condensed water droplets falling down the cylinder walls or precipitating as rain would further condense the remaining water vapor below the piston. Increased pressure, caused by the incoming mixture would also tend to condense the vapor.

Controls of conventional nature well known in the art are employed to balance the removal of water vapor through port 66 into separate condensor 69 and the removal of condensed water by drain relief valve assembly 64 with the quantity of water entering the cylinder assembly 13d through water atomizer 59 and by reason of the combustion of the injected hydrogen and oxygen. It should be appreciated also the either the water vapor port 66 or the drain relief valve assembly 64 alone could provide the function of removing surplus water.

Fourth Alternate Embodiment

Yet another embodiment of the power plant is depicted in FIGS. 5 and 5a, which like the next preceding embodiment relies upon the ignition of a mixture of hydrogen and oxygen in the presence of atomized water. This embodiment which is indicated generally as 11e, differs from the previous embodiment in that it does not include an air reservoir with its attendant parts, nor in inlet port with valve for pumping fresh air through its upper end wall, but has, instead, adjacent its upper end wall 17f, connected to cylinder assembly 12e through cylinder wall 16e, the same elements, power plant 11d has adjacent its lower end. These elements include hydrogen injector 34f, fuel ignition structure 36f, oxygen injector 58f, water vapor atomizer 59f, water vapor port 66f, spring-biased valve 67f, and connecting tube 68f for the transmission of water vapor to separate condensor 69. Power plant 11e also has a drain relief valve assembly 64e which has the same elements as valve assembly 64, said elements depicted by appending the letter "e" to the corresponding numerals.

The piston assembly 13e has within a magnetic disc 38e, a drain relief valve assembly 64f which includes all of the elements of the drain release valve assembly 64e, which in turn is identical to drain relief valve assembly 64 of power plant 11d, located in the thickened lower end 17e of cylinder assembly 12e, with the exception of drain pathway 77e. In lieu of pathway 77e drain release assembly 64f has a pathway 84 which serves to permit water to flow from drain release valve assembly 64f into cylinder assembly 12e beneath piston assembly 13e. In all respects, drain release valve assembly 64e and 64f operate in the same manner as drain release valve assembly 64, except that pathway 84 directs the exiting water into the cylinder beneath piston 13e.

In all other respects, power plant 11e has parts parallel to those of power plant 11d and said parts are designated by corresponding numerals with the letter "e" appended thereto.

The process of converting energy with the power plant 11e includes a starting phase identical to that of the starting phase of power plant 11d, with the exception that all of the air above piston assembly 13e has been replaced by steam which, upon condensing, draws the piston assembly upward. The piston assembly 13e is also lifted by super-heated steam from below, to apex position 46f near upper end wall 17f.

Prior to piston assembly 13e reaching apex position 46f, hydrogen injector 34f and oxygen injector 58f admit hydrogen and oxygen in the ratio of two parts to one part, respectively, into cylinder assembly 12e above apex position 46f, and as cylinder assembly 13e reaches apex position 46f, additional water is admitted above apex position 46f by water atomizer 59f and simultaneously the ignition structure 36f ignites the hydrogen. At this instance the repeating cycle of power plant 11e is initiated and all of the valves, injectors, and ignition structures, being controlled by electronic timing devices (not shown), also operate in the same sequence and in similar manner as described above for the starting phase of power plant 11d.

Obviously, numerous modifications and variations of the present invention are possible in light of the above teachings. It is therefore to be understood that within the scope of the appended claims, the invention may be practiced otherwise than as specifically described therein.

I claim:

1. A process for converting gas expanding energy sources into useful other forms of energy, such as inducing an alternating current in a coil, comprising the steps of:

holding a piston means forming a magnetic field at a starting position near a lower end of a cylinder means, also having an upper end, with a load-connected electrical conductor coil means surrounding it intermediate said ends thereof;

lifting said piston means to an apex position near an upper end of said cylinder means thereby opening a spring-biased valve mounted in a first outlet port in said upper end in order to transfer the column of air above the piston means through a tube into a reservoir means;

permitting said piston means to initiate a repeating cycle by free falling within said cylinder means thereby allowing said spring-biased valve in the first outlet port to close, opening a spring-biased valve mounted in a first inlet port in said upper end in order to admit a charge of fresh air and opening a spring-biased mechanically operated exhaust valve mounted in a second outlet port in said lower end;

closing the valve in said second outlet port at the bottom of the cylinder when the piston means has fallen far enough to enable it to compress as much fresh air beneath it to allow it to reach said starting point;

injecting fuel into the air in the cylinder means beneath said piston means starting position prior to its reaching said starting position;

igniting the fuel and air mixture at approximately the instant when said piston means has reached said starting position thereby forcing said piston means towards the upper end, again opening said first outlet port for transferring the column of air above and ahead of said piston means into said reservoir;

opening a valve mounted in a second inlet port, intermediate the lower and upper ends of said cylinder means, and connected by pipe to a lower end of said reservoir means, as the piston means passes upwardly by, in order that compressed air in the reservoir will enter the cylinder means behind the piston between the piston means and the lower end of said cylinder means and expel the contaminated gases through the second outlet port; and closing said second inlet port when the piston means has again reached a point near the upper end of the cylinder means and is in position to again free-fall for the next repetition of the cycle.

2. The process as defined in claim 1 wherein said steps of holding the piston means at a starting position and lifting it to an apex position are carried out by admitting compressed air.

3. A device for converting fuel energy into useful other forms of energy, such as inducing an alternating current in a coil, comprising:

means for holding a piston means forming a magnetic field at a starting position near a lower end of a cylinder means also having an upper end, with a load-connected electrical conductor coil means surrounding it intermediate the ends thereof;

means for lifting said piston means to an apex position near the upper end of said cylinder means;

means for permitting said piston means to initiate a repeating cycle by free falling within said cylinder means to said starting position;

means for injecting fuel into the air in said cylinder means beneath said piston means starting position and prior to said piston means reaching said starting position;

means for igniting the fuel and air mixture at approximately the instant when said piston means has reached said starting position thereby forcing the piston towards the upper cylinder end from where the cycle may again be repeated; and means for sequentially timing the injecting and igniting of the fuel, the admitting air and fuel, and the exhausting of air and contaminated gases including:

a first outlet port in the upper end of the cylinder having a spring-biased valve mounted therein for transferring the column of air above the piston, as it ascends, through a tube connected to an upper end of a reservoir means;

a first inlet port in the upper end of the cylinder having a spring-biased valve mounted therein for admitting fresh air above the piston, as it falls;

a second outlet port in the lower end of the cylinder having a spring-biased mechanically operated valve mounted therein for permitting the piston to fall initially and expel contaminated gases without compressing air beneath it so that it may be closed at a predetermined time so as to permit the piston to reach its starting position and to begin to compress air beneath it;

a second valved inlet port, intermediate the lower and upper cylinder ends and connected by a tube to a lower end of the reservoir means for admitting compressed air from the reservoir means into the cylinder to expel contaminated gases through the second outlet port and provide a fresh charge of air after the piston passes upwardly by said second inlet port; and electronic timing means for synchronizing the holding, lifting, and free fall permitting of the piston means; the injecting and igniting of the fuel; and the opening and closing of the valves.

4. The device as defined in claim 3 wherein the means for holding the piston means at a starting position, lifting it to an apex position, and permitting it to free fall is a controlled source of compressed air which may be same as reservoir 14.

5. The device as defined in claim 3 or 4 wherein the reservoir means 14 has a third outlet port intermediate the ends thereof with a valve mounted therein for tapping the surplus compressed air therein as an additional source of useful energy.

6. A process for converting gas expanding energy sources into useful other forms of energy, such as inducing an alternating current in a coil, comprising the steps of:

holding a piston means forming a magnetic field and slidably operable, but otherwise unattached, within a substantially enclosed cylinder means at a starting position near a lower end thereof, by compressed gas below said piston means, said cylinder means having a load-connected electrical conductor coil means surrounding it intermediate its ends;

lifting said piston means to an apex position near the upper end of said cylinder means by substantially altering the difference in gas pressure below said piston means in relation to the gas pressure thereabove, thereby opening a spring-biased valve mounted in an outlet port in the upper end of said cylinder means in order to transfer the column of air above the piston means through a tube into a reservoir means;

permitting said piston means to return to said starting position for completion of the cycle, thereby allowing the spring-biased valve in the outlet port to close and opening a spring-biased valve in an inlet port in the upper end of said cylinder means in order to admit a charge of fresh air; and stopping the downward movement of said piston means at said starting position by compressed gas below said piston means, thereby completing a cycle which can be repeated by starting at the step in paragraph three above.

7. The process as defined in claim 6 wherein the step of holding a piston means at a starting position is carried out by the compressive support of a liquid and a gas in a bounce chamber at the bottom of the cylinder means, the step of lifting the piston means to an apex position comprises vaporizing the liquid by directing a concentrated solar beam onto it; and the step of permitting said piston means to return to the starting position comprises, discontinuing directing the concentrated solar beam, allowing the vapors to condense and form a vacuum.

8. The process as defined in claim 7 wherein a second said process as defined in claim 7 is initiated by directing the concentrated solar beam onto a second quantity of liquid which has been holding a second piston means at a starting position in the bottom of a second cylinder means at the moment the directing of the beam on the first quantity of liquid is discontinued and then redirecting the beam onto the first quantity of liquid at the moment the directing of the beam on the second quantity of liquid is discontinued.

9. The process as defined in claims 7 or 8 wherein the quantities of liquid are black colored.

10. The process as defined in claims 7 or 8 wherein the timing of the directing, discontinuing, and redirecting the concentrated solar beam is carried out with electronic timing means and a movable flat mirror.

11. A device for converting gas expanding and contracting energy sources into useful other forms of energy, such as inducing an alternating current in a coil, comprising:

a liquid and a gas located in the bottom of a cylinder means to support in a starting position near a lower end of the cylinder means a piston means forming a magnetic field, said cylinder means also having an upper end and a load-connected electrical conductor coil surrounding it intermediate said ends thereof;

a transparent core in said upper cylinder end and another in said piston means for permitting a concentrated solar beam to be intermittently directed on said liquid in order to vaporize said liquid for lifting the piston means to an apex position near the upper end of said cylinder means and after condensing, causing said piston means to return to said starting position to complete a cycle;

a spring-biased valve mounted in an outlet port in the upper end of the cylinder means for allowing the column of air above the piston means to be forced through a connecting tube;

a compressed air reservoir to receive the air from the connecting tube and a spring-biased valve mounted in an inlet port in the upper end of the cylinder means to allow the piston means to pull a fresh column of air in above it as it falls to its starting position;

concentrated solar beam directing means; and means for sequentially timing the directing and discontinuing directing of the concentrated solar beam on the liquid.

12. The device as defined in claim 11 wherein a second said device as defined in claim 11 is operated by intermittently directing the concentrated solar beam on the liquid in the bottom of the second device so that the two cycle phases of the two devices are one-half cycle out of step with each other.

13. The devices as defined in claims 11 or 12 wherein the liquid is black colored.

14. A process for converting gas expanding and contracting energy sources into useful other forms of energy, such as inducing an alternating current in a coil, comprising the steps of:

holding a piston means forming a magnetic field at a starting position near a lower end of a cylinder means with the compressive support of water, said cylinder means also having an upper end, with a load-connected electrical conductor coil means surrounding it intermediate said ends thereof;

introducing separate charges of hydrogen and oxygen in ratio of two parts to one, respectively, below said starting position;

lifting said piston means to an apex position near an upper end of said cylinder means by igniting the hydrogen oxygen mixture located therein and introducing atomized water beneath the starting position at substantially the same time thereby opening a spring-biased valve mounted in a first outlet port in said upper end in order to transfer the column of air above the piston means through a tube into a reservoir means;

permitting said piston means to initiate a repeating cycle by free falling within said cylinder means thereby allowing said spring-biased valve in the first outlet port to close and opening a spring-biased valve mounted in a first inlet port in said upper end in order to admit a charge of fresh air;

admitting separate fresh charges of hydrogen and oxygen in ratio of two parts to one, respectively, below said starting position when the piston means has fallen to a position approximately mid-way between the apex and the starting positions;

igniting the fresh charge of hydrogen-oxygen mixture at approximately the instant when said piston means has reached said starting position, thereby forcing said piston means to the apex position where it can again free fall for the next repetition of the cycle, and again opening said first outlet port for transferring the column of air above and ahead of said piston means into said reservoir;

discharging surplus water accumulating in the cylinder means through a sealed valve means in its lower end.

15. The process as defined in claim 14 further comprising the steps of allowing any remaining water or water vapor in the cylinder means to escape through a valve means into a cooling condensor containing a near perfect vacuum by opening the valve means when the piston means reaches the apex position and closing it when the separate fresh charges of hydrogen and oxygen are admitted.

16. The process as defined in claims 14 or 15 where the separate fresh charges of hydrogen and oxygen are admitted at one or more locations above the starting position but below the apex position when the piston means is still at the apex position.

17. A device for converting gas contracting energy sources into useful other forms of energy, such as inducing an alternating current in a coil, comprising:
water located in the bottom of a cylinder means to support in a starting position near a lower end of the cylinder means a piston means forming a magnetic field, said cylinder means also having an upper end and a load-connected electrical conductor coil surrounding it intermediate said ends thereof;

separate valve means for introducing charges of hydrogen and oxygen in ratio of two parts to one, respectively, below said starting position;

means for igniting the hydrogen-oxygen mixture located beneath the piston means starting position;

means for introducing atomized water beneath the piston means starting position;

a spring-biased valve mounted in an outlet port in the upper end of the cylinder means for allowing the column of air above the piston means to be forced through a connecting tube into a compressed air reservoir;

a spring-biased valve mounted in an inlet port in the upper end of the cylinder means to allow the piston means to pull a fresh column of air above it as it returns to the starting position;

means for discharging surplus water accumulating in the cylinder means through a sealed valve means in its lower end; and electronic timing means for synchronizing the holding of the piston means; admitting of hydrogen, oxygen and atomized water; igniting of the hydrogen-oxygen mixture; and the opening and closing of the valves.

18. The device as defined in claim 17 further comprising:
a spring-biased outlet valve located in a port beneath the starting position for allowing any remaining water or water vapor to escape when the piston means reaches the apex position; and
a cooling condensor connected by tube to said valve.

19. The device as defined in claim 17 wherein the igniting means is a laser beam.

20. The device as defined in claim 17 wherein the means for discharging surplus water comprises:
a concave shaped top of the lower end of the cylinder means for permitting suplus water to drain towards a point;
a drain pathway in said lower end for permitting surplus water to exit from the cylinder means;
a cylindrical valve means with a horizontal longitudinal axis locatd within a recess within said lower end having a depression within it for alternately receiving and discharging said surplus water through said pathway; and
a pressure control means linked to said cylindrical valve means for causing said surplus water to be discharged upon the cylinder means internal pressure beneath the piston means rising above predetermined levels.

21. The device as defined in claim 20 wherein the pressure control means comprises:
an activating piston located in a recess in the top of the lower end of the cylinder means;
a coil spring supporting the activating piston at its low pressure point so that the upper surface of the actvating piston is above the top of the lower end of the cylinder means;
an arm, located within a vertical planar recess in the lower end of the cylinder means pivoting from a depending arm secured to the bottom of the activating piston to a pivot means on an end of the cylinder valve means so as to cause the cylinder valve means to discharge surplus water from the cylinder means through the pathway when the internal pressure rises.

* * * * *